United States Patent
Ushio et al.

(10) Patent No.: US 7,687,170 B2
(45) Date of Patent: Mar. 30, 2010

(54) FUEL CELL SYSTEM

(75) Inventors: Takeshi Ushio, Wako (JP); Yukihiko Itai, Wako (JP); Ryu Okano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 875 days.

(21) Appl. No.: 11/495,770

(22) Filed: Jul. 31, 2006

(65) Prior Publication Data
US 2007/0031710 A1     Feb. 8, 2007

(30) Foreign Application Priority Data
Aug. 4, 2005  (JP) .............................. 2005-226964

(51) Int. Cl.
*H01M 8/04*   (2006.01)
(52) U.S. Cl. .............................. 429/25; 429/13; 429/28; 429/38
(58) Field of Classification Search .................... 429/28, 429/13, 25, 38
See application file for complete search history.

(56) References Cited

U.S. PATENT DOCUMENTS

| | | | |
|---|---|---|---|
| 7,037,609 B2* | 5/2006 | Sugawara et al. | 429/17 |
| 2004/0013928 A1* | 1/2004 | Yamauchi et al. | 429/34 |
| 2006/0286415 A1* | 12/2006 | Muller et al. | 429/13 |

FOREIGN PATENT DOCUMENTS

| | | | |
|---|---|---|---|
| JP | 62-272468 A | 11/1987 |
| JP | 5-13094 A | 1/1993 |
| JP | 2002-237322 A | 8/2002 |
| JP | 2002-280027 A | 9/2002 |

* cited by examiner

*Primary Examiner*—Jane Rhee
(74) *Attorney, Agent, or Firm*—Westerman, Hattori, Daniels & Adrian, LLP

(57) ABSTRACT

A fuel cell system in which fuel cell flooding is eliminated by providing necessary flow speed of fuel gas within a channel while improving system efficiency of the fuel cell by re-circulating unreacted fuel gas, which has been discharged externally from a circulation channel in order to provide the flow speed within the channel. An exhaust gas storage unit which stores exhaust gas is disposed in an exhaust gas recovery channel, to store exhaust gas discharged from the anode channel of the fuel cell. Fuel consumption can be improved by re-supplying the exhaust gas to the fuel cell again. Furthermore, an exhaust storage unit is maintained at a negative pressure. This allows the flow speed of reactant gas flowing through the channel for fuel gas to be increased at the time of opening the control valve connected to the exhaust gas storage unit. Such an arrangement allows water droplets or the like remaining within the anode electrode of the fuel cell to be removed, thereby suppressing flooding. This improves the system efficiency while suppressing fuel consumption.

6 Claims, 5 Drawing Sheets

FUEL CELL SYSTEM

This application is based on and claims the benefit of priority from Japanese Patent Application No. 2005-226964, filed on 4 Aug. 2005, the content of which is incorporated herein by reference.

BACKGROUND OF THE INVENTION

1. Field of the Invention

The present invention relates to a fuel cell system for generating electricity using fuel gas including hydrogen, and particularly relates to supplying of fuel gas in a fuel cell system.

2. Related Art

In recent years, there has been great expectation for fuel cells, as means for suppressing global warming and environmental destruction, and also as next-generation electrical-generating systems, and research is being actively pursued. Fuel cells generate energy by electrochemical reaction between hydrogen and oxygen, examples thereof including phosphoric-acid fuel cells, molten carbonate fuel cells, solid-oxide fuel cells, polymer electrolyte fuel cells, and so forth. Of these, polymer electrolyte fuel cells can be activated from room temperature and furthermore are small and have high power, and accordingly are gathering attention as a power source for vehicles (motorcycles, automobiles) and for portable power sources and the like.

With general polymer electrolyte fuel cells, an electrode structure, which is a basic configuration unit of the fuel cell, is sandwiched between separators, thereby forming a single cell. A combination thereof of the order of tens to hundreds of cells is used as a stack. An electrode structure serving as a basic configuration unit of a stack is formed of two electrodes, which are an anode electrode (fuel electrode) and cathode electrode (air electrode), and a polyelectrolyte membrane introduced therebetween. Also, normally, these electrodes are formed from a catalyst layer at which an oxidation and reduction reaction occurs in contact with the polyelectrolyte membrane, and a gas dispersion layer in contact with the catalyst layer.

Polymer electrolyte fuel cells having such a configuration generate electricity by supplying fuel including hydrogen to the anode electrode side and supplying oxygen or air to the cathode electrode side. Upon supplying fuel gas to the anode electrode, the hydrogen included in the fuel gas is ionized on the electrode catalyst. The ionized hydrogen moves to the cathode electrode side through the electrolytic membrane. On the other hand, the electrons generated in the aforementioned ionization step are extracted to an external circuit, thereby providing DC electric energy.

The above-described fuel cells also generate water as well as electricity during generating of electricity by the electrochemical reaction between the hydrogen gas serving as the fuel gas, and the oxygen. Normally, this water is purged from channels at both electrodes due to a gas flow supplied at a sufficient gas flow speed. However, in some cases, the gas flow speed drops due to a low load or the like. Such a case can lead to an undesired phenomenon in which the water therewithin is not completely discharged and closes off the channel (hereafter referred to as "flooding"). There has been a problem in that electricity generation becomes unstable when the channel of the fuel gas is closed off due to this flooding.

Furthermore, a method is being used wherein unreacted fuel gas discharged from the fuel cell is re-circulated to improve system efficiency. However, with such a method, vapor is also included in the re-circulated gas, so there has been a problem in that flooding occurs even more easily.

In view of such problems, an invention has been disclosed which solves flooding by external discharge of fuel gas (e.g., Japanese (Unexamined) Patent Application Publication No. 2002-237322). The invention disclosed in this publication solves flooding by closing a valve within the circulation system channel and opens a discharge valve to prevent backflow and to increase the flow speed within the fuel cell channel, in the event that flooding occurs due to reduction in suction of an ejector pump or the like.

Moreover, an invention has been disclosed wherein flooding is solved using a compressor such as an electric pump or the like in the circulation of the fuel gas (e.g., Japanese (Unexamined) Patent Application Publication No. 2002-280027). That is to say, while, in general, the fuel gas circulation amount is determined corresponding to the load of the fuel gas, the invention disclosed in this publication provides an arrangement in which the circulation flow is corrected corresponding to the electricity generating state. That is to say, in the event that flooding or the like occurs, the output of the pump is increased to enhance the circulation flow, thereby solving flooding while reducing external discharge of fuel gas.

Furthermore, an invention has been disclosed wherein hydrogen off-gas is extracted, the hydrogen collected by a hydrogen collector is stored in a storage tank, and then supplied to the fuel cell again using a supply pump (e.g., Japanese (Unexamined) Patent Application Publication No. 62-272468). Moreover, an invention has been disclosed wherein hydrogen off-gas is extracted, and hydrogen collected by a hydrogen generator is stored in a hydrogen storage unit and then supplied to the fuel cell again (e.g., Japanese (Unexamined) Patent Application Publication No. 5-13094). The inventions disclosed in these publications suppress consumption of fuel in the fuel cell system by re-circulating the unreacted gas discharged from the fuel cell.

However, with the invention disclosed in Japanese (Unexamined) Patent Application Publication No. 2002-237322, fuel consumption efficiency decreases due to discharging the fuel gas externally in order to increase the flow speed within the fuel cell channel, thereby deteriorating the efficiency of the overall system. Also, while the invention disclosed in Japanese (Unexamined) Patent Application Publication No. 2002-280027 is capable of reducing the external discharge amount of fuel gas, a compressor such as an electric pump or the like which is capable of blowing out water droplets in the channel of the fuel cell, becomes necessary, which leads to the problem of increased weight and size. Further, energy necessary for driving this compressor must be supplied, meaning that the overall efficiency of the system is deteriorated to that extent.

Also, with the inventions disclosed in Japanese (Unexamined) Patent Application Publication Nos. 62-272468 and 5-13094, the hydrogen discharged from the fuel cell can be efficiently used up, but the flow speed within the reactant gas channel cannot be increased, leading to the problem that flooding easily occurs.

SUMMARY OF THE INVENTION

The present invention has been made in light of the above problems, and accordingly it is an object thereof to solve the problem of flooding by giving fuel gas a channel flow speed the necessary for eliminating flooding in fuel cells while re-circulating unreacted fuel gas which has been discharged to outside the circulation channel in order to provide this channel flow speed, thereby improving the efficiency of the fuel cell system.

According to one aspect of the present invention, a fuel cell system comprises: a fuel cell for generating electricity by chemical reaction between fuel gas and oxidant gas; a supply channel for flowing the fuel gas supplied from fuel supply device to the fuel cell; a circulation channel which is connected to the supply channel and which is for circulating exhaust gas, discharged from a fuel electrode of the fuel cell, to the fuel cell; and an exhaust gas recovery channel which divides from the circulation channel and is connected to the circulation channel or the supply channel. With such an arrangement, the exhaust gas recovery channel has a first control valve controlled by control device, a first exhaust gas storage unit connected to the first control valve, and a pressure adjusting unit for setting the first exhaust gas storage unit to a negative pressure.

With this configuration, an exhaust gas storage unit which stores exhaust gas is disposed in the exhaust gas recovery channel, to store exhaust gas discharged from the anode channel of the fuel cell. Also, fuel consumption can be improved by supplying the exhaust gas to the fuel cell again. Furthermore, the exhaust storage unit is maintained at a negative pressure. This allows the flow speed of reactant gas flowing through the channel for fuel gas to be increased at the time of opening the control valve connected to the exhaust gas storage unit. Such an arrangement allows water droplets or the like remaining within the anode electrode of the fuel cell to be removed therefrom, thereby suppressing flooding. This improves the system efficiency while suppressing fuel consumption.

Also, the circulation channel may include gas-liquid separating device for separating water and gas from the exhaust gas.

With this configuration, gas-liquid separating device are disposed in the circulation channel. Accordingly, this realizes removal or reduction of moisture and the like included in the unreacted fuel gas (hereafter referred to as exhaust gas) discharged from the fuel cell. Such an arrangement allows occurrence of flooding to be suppressed while re-circulating the exhaust gas or re-supplying the exhaust gas to the first exhaust gas storage unit. Furthermore, this improves the system efficiency while improving fuel consumption.

Also, the exhaust gas recovery channel may include a second exhaust gas storage unit, and a second control valve provided at the connection portion of the exhaust gas recovery channel and the supply channel, in addition to the first exhaust gas storage unit. With such an arrangement, the pressure adjusting unit sets the first exhaust gas storage unit to a negative pressure and also pressurizes the second exhaust gas storage unit. Furthermore, the control device control opening of the first control valve and the second control valve.

With this configuration, in addition to the first exhaust gas storage unit, a pressurized second exhaust gas storage unit is provided to the exhaust gas recovery channel. With such an arrangement, the flow speed within the channel is increased due to pressuring of the second exhaust gas storage unit, in addition to the increase of the flow speed within the channel due to the negative pressure in the first exhaust gas storage unit. This allows a greater flow speed to be obtained within the anode channel of the fuel cell with a relatively small storage container, thereby enabling a great number of water droplets and the like to be removed. This suppresses occurrence of flooding, and improves the system efficiency while suppressing fuel consumption.

Also, the exhaust gas recovery channel may include fuel gas separating device for selectively separating fuel gas from the exhaust gas.

With this configuration, fuel gas separating device for selectively separating fuel gas from the exhaust gas are provided in the exhaust gas recovery channel. With such an arrangement, impurities are removed from the exhaust gas. This enables the concentration of the impurity gas within the circulation channel to be maintained at or below a level which does not affect generating of electricity while preventing the impurity gas from being externally discharged. This also improves electricity generation stability. Accordingly, fuel consumption can be suppressed, and system efficiency can be improved.

The reactant gas included in the impurity gas yielded by separating the fuel gas from the exhaust gas by the fuel gas separating device may be burnt by combustion device connected to the fuel gas separating device.

With this configuration, combustion device are provided for burning reactant gas included in the impurity gas yielded by separating the fuel gas from the exhaust gas. Accordingly, even in the event that fuel gas is included in the impurity gas, burning the fuel gas prevents the fuel gas from being externally discharged. Furthermore, the heat generated by combustion of the fuel gas can be used for heating the fuel cell or the like, for example. Accordingly, the system efficiency can be improved.

The exhaust gas recovery channel may further comprise a bypass channel circumventing the pressure adjusting unit. With such an arrangement, the bypass channel includes a check valve for restricting backflow of the exhaust gas.

With this configuration, the exhaust gas recovery channel is provided with a bypass channel which includes a check valve, and which circumvents the pressure adjusting unit. Thus, change in pressure of the circulation channel corresponding to change in the electricity generating state of the fuel cell can be advantageously used, so electric power consumption of the pressure adjusting unit can be reduced. Accordingly, fuel consumption can be suppressed, and system efficiency can be improved.

According to the present invention, exhaust gas is recovered and reused while providing a channel speed necessary for eliminating flooding of fuel cells by discharging fuel gas from the circulation channel to the exhaust gas storage unit, whereby system efficiency can be improved.

Also, placing the inside of the exhaust gas storage container in a negative pressure state yields an instantaneous flow speed sufficient for discharging water droplets in the fuel cell channel at the time of opening the exhaust gas storage container, so there is no need to increase the size of the exhaust gas storage container. The pump for pumping out exhaust gas from the exhaust gas storage container and supplying to the fuel cell again can also be small and low-output as compared to a circulation electric pump having sufficient capabilities for directly blowing out water in the channel.

Furthermore, separating and discharging the impurity gas at the time of collecting and re-supplying the exhaust gas enables the concentration of impurity gas within the circulation channel to be maintained at or below a level which does not affect generating of electricity.

DETAILED DESCRIPTION OF THE INVENTION

Embodiments of the present invention will be described below with reference to the drawings. The present invention is in no way restricted to the following embodiments, and various forms may be taken within the technical scope of the present invention.

Figure 1:
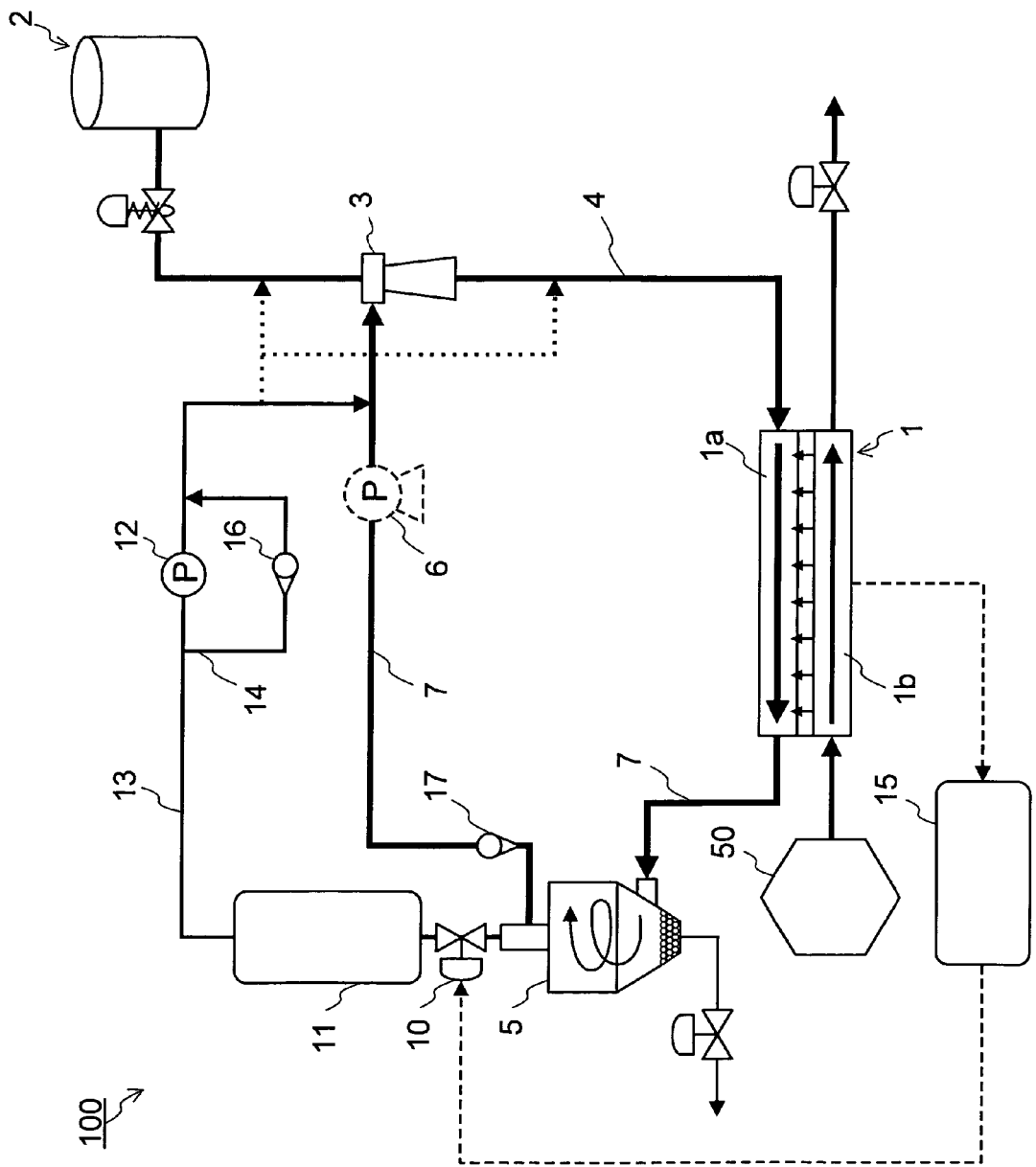
FIG. 1 is a configuration diagram of a fuel cell system according to a first embodiment of the present invention.
Figure 2:
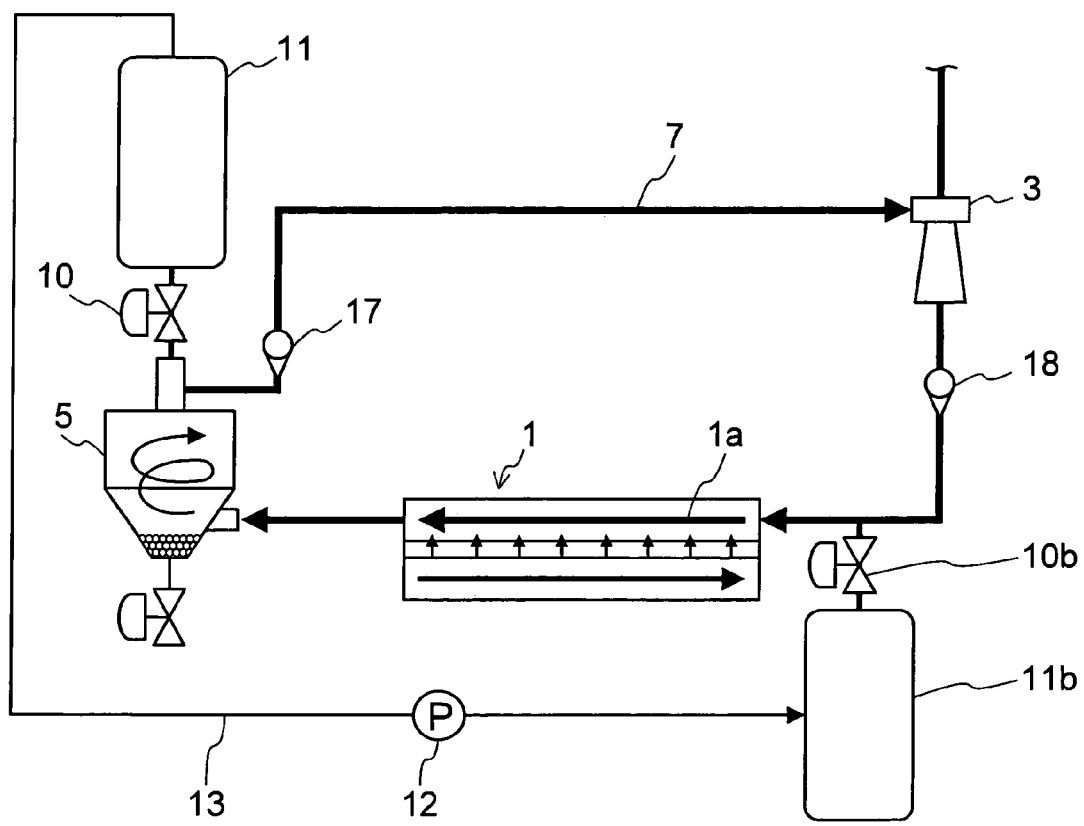
FIG. 2 is a configuration diagram of a fuel cell system according to a second embodiment of the present invention.
Figure 3:
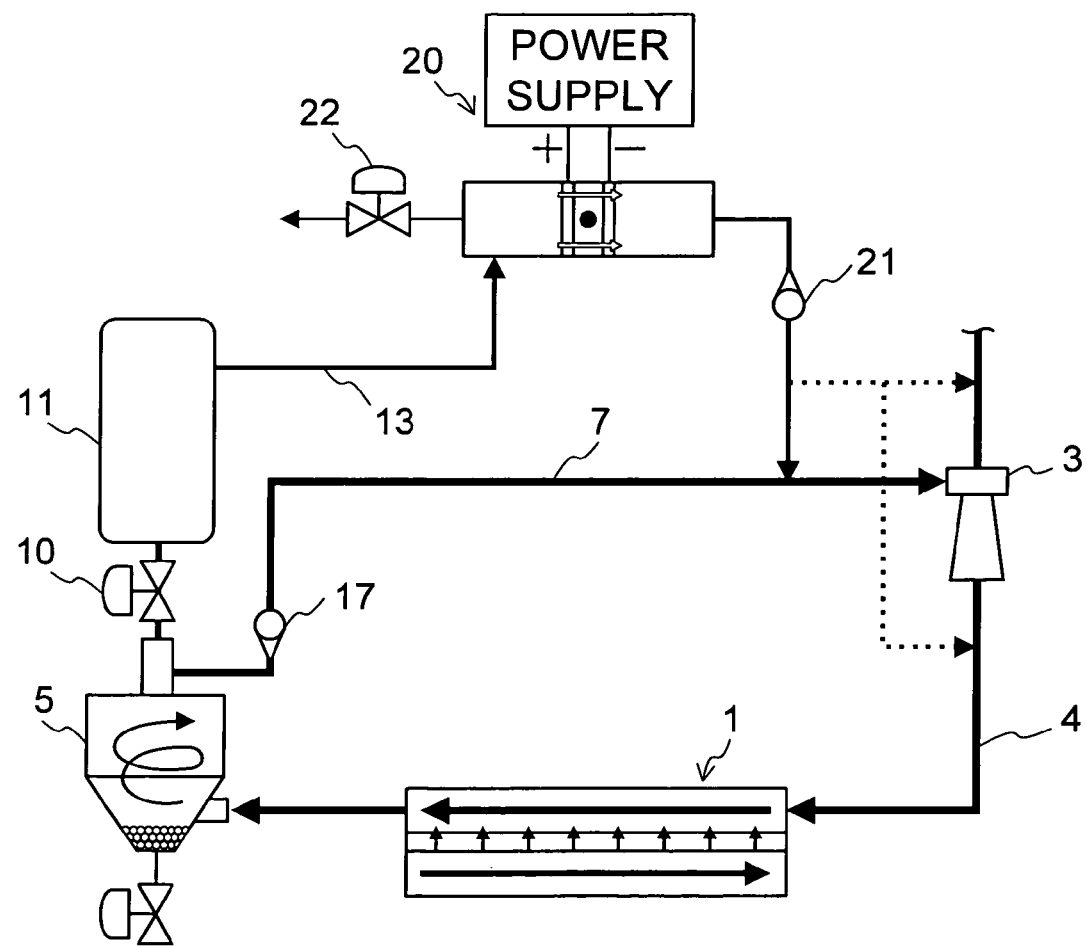
FIG. 3 is a configuration diagram of a fuel cell system according to a third embodiment of the present invention.
Figure 4:
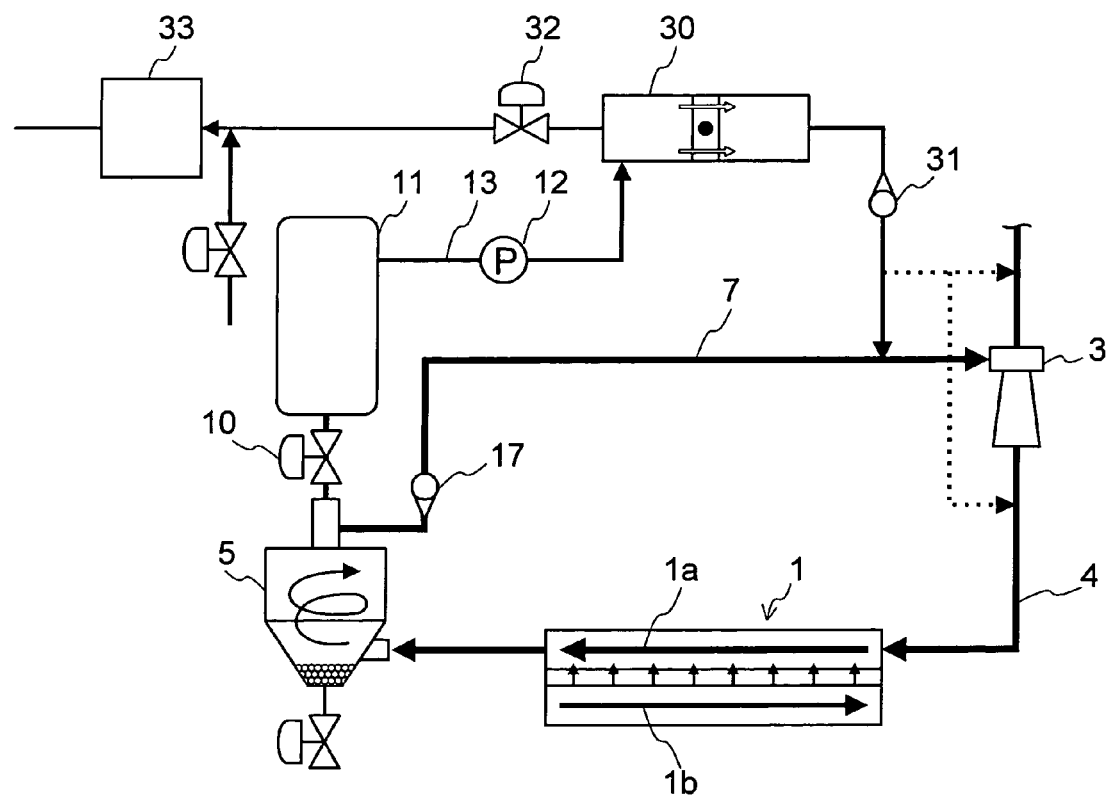
FIG. 4 is a configuration diagram of a fuel cell system according to a fourth embodiment of the present invention.
Figure 5:
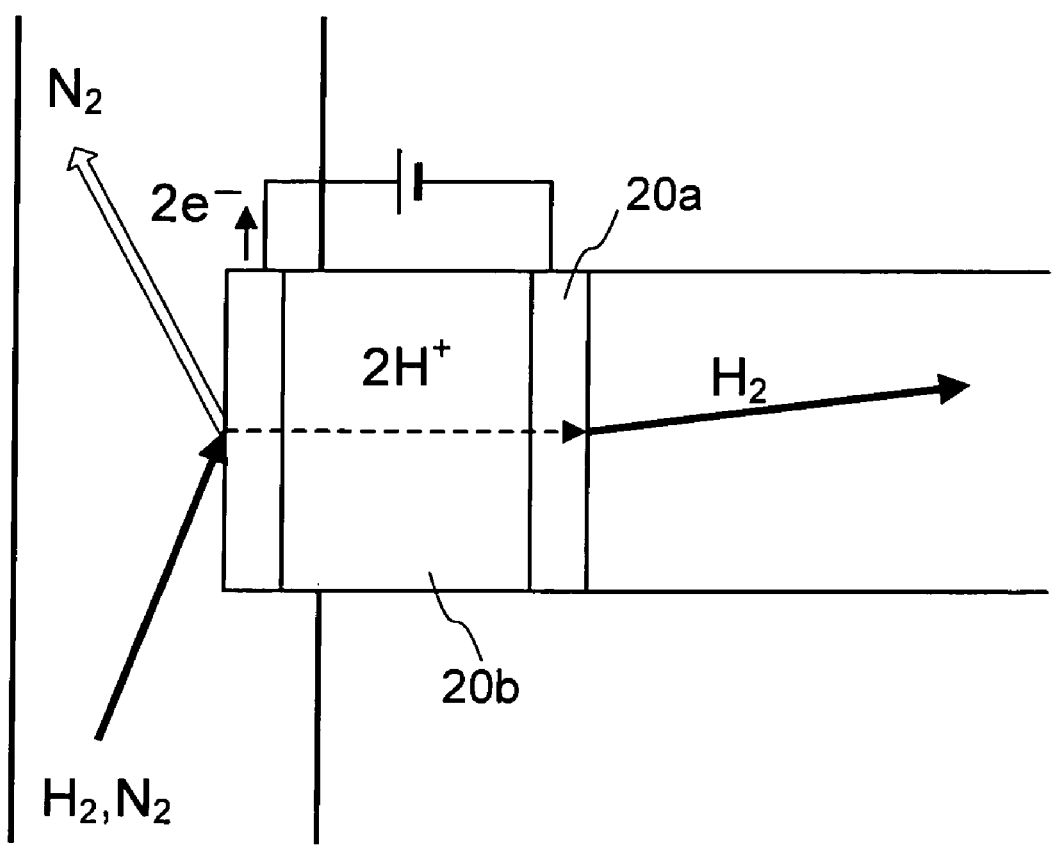
FIG. 5 is a schematic diagram illustrating properties of an electrochemical hydrogen pump according to the third embodiment of the present invention.

FIG. 1 is a configuration diagram of a fuel cell system according to a first embodiment of the present invention. FIG. 2 is a configuration diagram of a fuel cell system according to a second embodiment of the present invention. FIG. 3 is a configuration diagram of a fuel cell system according to a third embodiment of the present invention. FIG. 4 is a configuration diagram of a fuel cell system according to a fourth embodiment of the present invention. FIG. 5 is a schematic diagram illustrating properties of an electrochemical hydrogen pump according to the third embodiment of the present invention.

A fuel cell system 100 according to the present invention is mounted on a fuel cell vehicle as a driving electric power source, for example.

First Embodiment

As shown in FIG. 1. the fuel cell system 100 according to the first embodiment of the present invention includes: a fuel cell 1; a supply channel 4 in which are disposed a fuel supply device 2 and an ejector pump 3; a circulation channel 7 in which are disposed a gas-liquid separator 5 and a circulation pump 6; an exhaust gas recovery channel 13 in which are disposed a first control valve 10, a first exhaust gas storage container 11, and a exhaust gas recovery pump 12; a bypass channel 14 which circumvents the exhaust gas recovery pump 12 of the exhaust gas recovery channel 13; and a control device (ECU) 15. Also, the circulation channel 7 and bypass channel 14 have check valves 16 and 17 provided. Note that the circulation pump 6 is not indispensable in the event that the ejector pump 3 is used.

The fuel cell 1 has a configuration in which a polymer electrolyte membrane formed of a cation-exchange membrane or the like is held between an anode electrode (fuel electrode) formed of an anode catalyst and a gas dispersion layer, and a cathode electrode (air electrode) formed of a cathode catalyst and a gas dispersion layer, thereby forming an electrode structure. A configuration wherein this electrode structure is further held between a pair of separators forms a single sell. The fuel cell 1 is configured by layering a great number of such single cells. A groove is formed on the surface of each separator facing the electrode structure. These grooves and the electrode structure form an anode channel 1a and a cathode channel 1b.

Fuel gas such as hydrogen gas (reactant gas) is supplied to the anode electrode of the fuel cell 1 from the supply channel 4 connected to the anode channel 1a. Hydrogen which has been ionized by catalytic reaction on the catalyst electrode of the anode electrode moves to the cathode electrode through the polymer electrolyte membrane which has been humidified to a suitable level. Electrons generated in this movement are extracted to an external circuit (omitted from the drawings), and used as DC electric energy. Air, serving as an oxidant gas (reactant gas) including oxygen, for example, is supplied from an input side channel connected to the cathode channel 1b by an air compressor 50, and the hydrogen ions, electrons, and oxygen react at the cathode electrode to generate water. A part of the generated water passes through the electrolyte membrane and moves to the anode channel 1a side as well. Exhaust gas including unreacted gas, and water, are discharged from the fuel cell through the circulation channel 7 connected to the anode channel 1a and an output side channel connected to the cathode channel 1b.

The fuel supply device 2 is configured from a high-pressure hydrogen tank having an isolation valve and a regulator. As for the regulator, a pneumatic proportionate pressure control valve or the like which discharges hydrogen of a predetermined pressure, taking pneumatic pressure supplied from the high-pressure tank or air compressor or the like as a signal pressure, will suffice. The hydrogen supplied from the fuel supply device 2 passes to the anode channel 1a of the fuel cell 1 through the ejector pump 3.

The ejector pump 3 supplies the hydrogen gas supplied from the fuel supply device 2 to the anode channel 1a. Also, from a sub-flow feed port, the ejector pump 3 suctions in exhaust gas discharged from the anode channel 1a, utilizing the negative pressure generated around the hydrogen gas flow passing through the ejector pump 3 at high speed, mixes this exhaust gas with the hydrogen supplied from the fuel supply device 2, and re-supplies this as a reactant gas to the fuel cell 1. Thus, the exhaust gas discharged from the fuel cell 1 is circulated through the circulation channel 7. That is to say, the sub-flow inlet port of the ejector pump 3 is connected to the circulation channel 7.

The circulation channel 7 has the gas-liquid separator 5. The gas-liquid separator 5 separates the moisture contained in the exhaust gas discharged from the anode channel 1a from the reactant gas. The separated reactant gas flows to the circulation channel 7 and the exhaust gas recovery channel 13. That is to say, the gas-liquid separator 5 is connected to the fuel gas discharge side of the anode channel 1a at one side, and is connected to the circulation channel 7 and the exhaust gas recovery channel 13 at the other side. Note that a drain valve is connected to the gas-liquid separator 5, from which moisture is externally discharged.

Furthermore, the circulation channel 7 has the circulation pump 6. The circulation pump 6 pumps up reactant gas separated at the gas-liquid separator 5, which is passed to the sub-flow inlet port of the ejector pump 3. That is to say, one side of the circulation pump 6 is connected to the gas-liquid separator 5, and the other side thereof is connected to the circulation channel 7 which connects to the sub-flow inlet port of the ejector pump 3.

The first exhaust gas storage container 11 is provided to the exhaust gas recovery channel 13. The first exhaust gas storage container 11 is maintained in a negative pressure state by way of the exhaust gas recovery pump 12. As for the exhaust gas recovery pump 12, a pump which is capable of maintaining the first exhaust gas storage container 11 in a negative pressure state, i.e., a pump which provides a gas flow without backflow, will suffice. Examples preferably employed include a bellows pump. Note that negative pressure as used here means a pressure which is lower than the surrounding pressure so as to generate a force which pulls inwards.

The first exhaust gas storage container 11 has one side thereof connected to the gas-liquid separator 5, and the other side connected to the exhaust gas recovery pump 12. Also, the first control valve 10 is provided between the first exhaust gas storage container 11 and the gas-liquid separator 5. The first control valve 10 is connected to the control device 15.

Also, the bypass channel 14 which circumvents the exhaust gas recovery pump 12 is provided to the exhaust gas recovery channel 13. This bypass channel 14 is provided with a check valve 16 facing the flow direction of the reactant gas. Note that one end of the exhaust gas recovery channel 13 is connected to the gas-liquid separator 5 side. On the other hand, the other end may be connected to either the circulation channel 7 or the supply channel 4. Note that connection to the supply channel 4 may be either upstream or downstream of the ejector pump 3.

Upon the first control valve 10 being opened by the control device 15 according to the electricity generating state of the fuel cell 1, the fuel gas within the supply channel 4, inside the fuel cell 1, and within the circulation channel 7 upstream of the check valve 17, flow all at once through the gas-liquid separator 5 into the first exhaust gas storage container 11 that is maintained in a negative pressure state, thereby removing water droplets and the like within the anode channel 1a.

The control device 15 determines the flooding state based on the electricity generating state of the fuel cell 1 (e.g., cell voltage which is the output voltage of the cells of the fuel cell) for example, so as to control opening and closing of the first control valve 10.

As described above, with the fuel cell system 100 according to the first embodiment, exhaust gas is circulated by driving the circulation pump 6. At the same time, the exhaust gas recovery pump 12 is driven, thereby maintaining the inside of the first exhaust gas storage container 11 at a negative pressure. In the event that the control device 15 determines that there is a need to discharge water droplets or the like, the first control valve 10 is opened. This creates a gas flow which passes through the inside of the fuel cell 1 by way of the circulation channel 7, toward the first exhaust gas storage container 11. Thus, water droplets within the anode channel 1a of the fuel cell 1 are discharged externally along with unreacted gas. The exhaust gas is subjected to separation of gas and liquid by the gas-liquid separator 5. Then, the reactant gas thus separated is supplied to the first exhaust gas storage container 11. Subsequently, this process is repeatedly performed.

Thus, with the fuel cell system 100 according to the first embodiment, exhaust gas discharged from the anode channel 1a of the fuel cell 1 is stored in the first exhaust gas storage container 11, and then supplied to the fuel cell 1 again so as to be circulated. This improves the fuel supply system. Furthermore, with the present embodiment, the first exhaust gas storage container 11 is maintained at negative pressure. With such an arrangement, upon opening the first control valve 10 connected to the first exhaust gas storage container 11, the flow speed of the reactant gas flowing through the reactant gas channel is increased. This removes droplets and the like remaining within the anode channel 1a of the fuel cell 1, thereby suppressing flooding. Accordingly, such an arrangement improves the system efficiency while suppressing fuel consumption. Furthermore, with the present embodiment, the bypass channel 14 having the check valve 16 is provided to the exhaust gas recovery pump 12. Such an arrangement allows the change in pressure in the circulation channel 7 corresponding to change in electricity generating states to be effectively used. Accordingly, this allows power consumption of the exhaust gas recovery pump 12 to be reduced.

Second Embodiment

The first embodiment described an arrangement in which the exhaust gas recovery channel 13 includes the first exhaust gas storage container 11 in a negative pressure state. According to a second embodiment, a second exhaust gas storage container 11b is provided to the exhaust gas recovery channel 13, in addition to the first exhaust gas storage container 11, as shown in FIG. 2. That is to say, with the second embodiment, the exhaust gas recovery channel 13 has the first control valve 10, the first exhaust gas storage container 11, the exhaust gas recovery pump 12, the second exhaust gas storage container 11b, and a second control valve 10b, which are disposed thereat in that order along the direction of gas flow. Also, one side of the exhaust gas recovery channel 13 is connected to the gas-liquid separator 5, while the other side of the exhaust gas recovery channel 13 is connected to the supply channel 4 which in turn is connected to the anode channel 1a of the fuel cell 1.

In this case, the exhaust gas recovery pump 12 is disposed between the first exhaust gas storage container 11 and the second exhaust gas storage container 11b, so that the first exhaust gas storage container 11 is depressurized due to the activation of the exhaust gas recovery pump 12, while the second exhaust gas storage container 11b is pressurized. That is to say, for the exhaust gas recovery pump 12, a pump which is capable of maintaining the first exhaust gas storage container 11 in a negative pressure state will suffice, a suitable example being a bellows pump.

First, the first control valve 10 and the second control valve 10b are closed, and the exhaust gas recovery pump 12 is activated. Accordingly, the first exhaust gas storage container 11 is maintained at a negative pressure while the second exhaust gas storage container 11b is maintained at a positive pressure. In the event that the control device 15 determines that there is a need to discharge water droplets or the like, the first control valve 10 and the second control valve 10b are opened simultaneously, which creates a powerful flow from the second exhaust gas storage container 11b (high-pressure container) to the first exhaust gas storage container 11 (negative-pressure container). Thus, the exhaust gas is discharged to the fuel cell 1 from the supply channel 4 connected to the second control valve 10b.

In this way, with the fuel cell system 100 according to the second embodiment, the exhaust gas recovery channel 13 includes the second exhaust gas storage container 11b maintained at a positive pressure, in addition to the first exhaust gas storage container 11. Such an arrangement provides the increased flow speed due to the pressure at the second exhaust gas storage container 11b, in addition to the increased flow speed within the channel due to the negative pressure at the first exhaust gas storage container 11. This allows more water droplets and the like remaining in the anode channel 1a of the fuel cell to be removed. Furthermore, such an arrangement has the advantage of allowing the flow speed to be quickened using a relatively small-sized container.

Third Embodiment

The first embodiment described an arrangement in which the exhaust gas recovery pump 12 is provided to the exhaust gas recovery channel 13. According to a third embodiment, an electrochemical hydrogen pump 20 may be disposed at the exhaust gas recovery channel 13, as shown in FIG. 3. The electrochemical hydrogen pump 20 is a pump having an electrolytic membrane therewithin, having functions to separate gas using a property in which only hydrogen molecules pass through the electrolytic membrane (see FIG. 5).

That is to say, with the third embodiment, the exhaust gas recovery channel 13 has the first control valve 10, the first exhaust gas storage container 11, the electrochemical hydrogen pump 20, and a check valve 21 disposed thereat, in that order along the direction of gas flow. Also, one side of the exhaust gas recovery channel 13 is connected to the gas-liquid separator 5, while the other end may be connected to either the circulation channel 7 or the supply channel 4. Note that connection to the supply channel 4 may be either upstream or downstream of the ejector pump 3.

Next, hydrogen gas separation by the electrochemical hydrogen pump 20 will be described. The electrochemical hydrogen pump 20 has a structure as shown in FIG. 5, wherein an electrode material 20*a* is disposed on both sides of a proton-conductive electrolytic membrane 20*b*.

A polymer electrolyte membrane is used for the electrolytic membrane 20*b*. The polymer electrolyte membrane is formed of a polyelectrolyte. Specifically, a fluorinated polymer wherein all or part of the polymeric backbone has been fluorinated, or a hydrocarbon polymer which does not include fluorine in the polymeric backbone, having an ion exchange group, is preferable. The type of ion exchange group is not restricted in particular, and may be optionally selected according to the usage. For example, a polyelectrolyte having at least one of the ion exchange groups of sulfonic acid, carboxylic acid, phosphoric acid, etc., may be used.

Specific examples of a polyelectrolyte which is a fluorinated polymer wherein all or at least part of the polymeric backbone has been fluorinated, having an ion exchange group, include perfluorocarbon sulfonic acid polymers such as Nafion (Registered Trademark), perfluorocarbon phosphonic acid polymers, trifluorostyrene sulfonic acid polymers, ethylene tetrafluoroethylene-g-styrene sulfonic acid polymers, etc. Of these, Nafion is preferably used.

Specific examples of a polyelectrolyte which is a hydrocarbon polymer, which does not include fluorine in the polymeric backbone and has an ion exchange group, include polysulfonic acid, polyaryletherketone sulfonic acid, polybenzimidazolealkyl sulfonic acid, polybenzimidazolealkyl phosphonic acid, etc. Also, polyarylene having a sulfonic acid group may be used as a polyelectrolyte. Specifically, a polyelectrolyte obtained by adding a quinone compound to a polyarylene copolymer having a sulfonic acid group, or parallel use of polyarylene having a sulfonic acid group and a carbon material subjected to ozone processing, or polyarylene having a sulfonic acid group bonded with carbon atoms configuring fullerene molecules, or the like, may be used.

The gas dispersing electrode material 20*a* is configured of a catalyst layer in contact with the electrolytic membrane 20*b* and a gas dispersion layer in contact with the catalyst layer. The catalyst layer contains an ion conductor and a catalyst wherein a support such as carbon or the like supports a metal. Note that the ion conductor is formed of polyelectrolyte. Examples of preferably used catalysts include catalysts of carbon supporting platinum, Pt—Ru catalysts of carbon supporting an alloy of platinum and ruthenium, etc.

The gas dispersion layer may have a configuration the same as for conventional common gas dispersion layers, preferably such that the hydrogen gas serving as the fuel can uniformly reach the catalyst layer. Specifically, the gas dispersion layer is formed of a Carbon Teflon (Registered Trademark) layer in contact with the catalyst layer, and a carbon paper layer in contact with this Carbon Teflon (Registered Trademark) layer.

With the electrochemical hydrogen pump 20 having such a configuration, upon applying voltage to both electrodes beforehand, and gas including nitrogen (an impurity) and hydrogen coming into contact with the electrode including the catalyst, the hydrogen becomes hydrogen ions, penetrates the electrolytic membrane, turns into hydrogen at the electrode on the other side, and accordingly the hydrogen alone is extracted. Note that activation of the electrochemical hydrogen pump 20 is controlled by the control device 15 (not shown) in the same way as with the first embodiment. High-concentration impurity gas that has been separated and concentrated is discharged externally from a discharge valve 22, and the fuel gas is passed to the circulation channel 7 or the supply channel 4 so as to be supplied to the fuel cell 1 again.

Thus, with the fuel cell system 100 according to the third embodiment, the electrochemical hydrogen pump 20 serving as a gas recovery pump is used to depressurize within the first exhaust gas storage container 11, and at the same time, gas separation of the exhaust gas is performed using a property of the electrochemical hydrogen pump 20 in that only hydrogen molecules pass through the electrolytic membrane therein. Accordingly, the concentration of the impurity gas included in the reactant gas circulating through the circulation channel 7 can be maintained at or below a level which does not pose problems for generating electricity.

Fourth Embodiment

Third embodiment has described an arrangement in which the electrochemical hydrogen pump 20 is disposed within the exhaust gas recovery channel 13. According to a fourth embodiment, a gas separation device 30 may be provided to the exhaust gas recovery channel 13. That is to say, with the fourth embodiment, the exhaust gas recovery channel 13 has the first control valve 10, the first exhaust gas storage container 11, the exhaust gas recovery pump 12, the gas separation device 30, and a check valve 31 disposed thereat in that order along the direction of gas flow. Also, one side of the exhaust gas recovery channel 13 is connected to the gas-liquid separator 5, while the other end may be connected to either the circulation channel 7 or the supply channel 4. Note that connection to the supply channel 4 may be either upstream or downstream of the ejector pump 3.

The gas separation device 30 is for selectively separating just the hydrogen contained in the exhaust gas introduced thereto, and flowing this to the supply channel 4 or the circulation channel 7. The gas separation device 30 has a configuration in which a hydrogen-permselective membrane, which allows hydrogen to selectively pass through, is sandwiched between a gas introduction chamber and a hydrogen isolation chamber. Note that known examples of hydrogen-permselective membranes include: a palladium foil, polymer membranes such as aromatic polyimide membranes, etc. The exhaust gas discharged from the first exhaust gas storage container 11 is first introduced to the gas introduction chamber. Hydrogen included in the exhaust gas in the gas introduction chamber is forced to permeate the hydrogen-permselective membrane due to the pressure of exhaust gas being discharged from the first exhaust gas storage container 11 kept at a negative pressure by the exhaust gas recovery pump 12. Impurities, other than hydrogen, are concentrated under the pressure exerted by the exhaust gas recovery pump 12. The hydrogen within the hydrogen isolation chamber flows to the circulation channel 7 or supply channel 4 via the check valve 31 of the exhaust gas recovery channel 13.

Note that a vent valve 32, of which the opening and closing are controlled by the control device 15, for example, is provided in the gas introduction chamber, so that impurities other than hydrogen remaining in the gas introduction chamber can be externally discharged.

With the fourth embodiment having such a configuration, first, the exhaust gas recovery pump 12 is activated to place the first exhaust gas storage container 11 under negative pressure and also at the same time to send exhaust gas to the gas separation device 30 using the hydrogen-permselective membrane. The high-concentration impurity gas that has been separated and concentrated is externally discharged, and the separated fuel gas is supplied to the fuel cell 1 again. Thus, the concentration of the impurity gas included in the reactant gas circulating through the circulation channel 7 can be maintained at or below a level which does not pose problems for generating electricity. Also, the high-concentration impurity gas separated and concentrated at the gas separation device 30, and the unseparated fuel gas, are mixed with an oxidant gas such as air or the like, and then guided to a catalytic burner and burnt, thereby preventing unseparated fuel gas from escaping to the environment. Platinum, palladium, etc., can be used as hydrogen combustion catalysts.

Thus, with the fuel cell system 100 according to the fourth embodiment, fuel gas separating device for selectively separating fuel gas from exhaust gas are disposed in the exhaust gas recovery channel. With such an arrangement, impurities can be removed from the exhaust gas, thereby maintaining the concentration of the impurity gas within the circulation channel at or below a level which does not pose problems for generating electricity. This improves electricity generation stability. Also, with the present embodiment, combustion device are provided for burning reactant gas remaining in the impurity gas. This allows the fuel gas to be prevented from being discharged into the environment even in the event that fuel gas remains in the impurity gas, and the combustion heat therefrom can be utilized as well.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A fuel cell system comprising:
   a fuel cell for generating electricity by chemical reaction between fuel gas and oxidant gas;
   a supply channel for flowing said fuel gas supplied from fuel supply device to said fuel cell;
   a circulation channel which is connected to said supply channel and which is for circulating exhaust gas, discharged from a fuel electrode of said fuel cell, to said fuel cell; and
   an exhaust gas recovery channel which divides from said circulation channel and is connected to said circulation channel or said supply channel, wherein
   said exhaust gas recovery channel comprises
   a first control valve controlled by a control device,
   a first exhaust gas storage unit connected to a downstream side of said first control valve, and
   a pressure adjusting unit for setting said first exhaust gas storage unit to a negative pressure, wherein
   said control device determines a flooding state so as to control opening and closing of said first control valve.

2. A fuel cell system according to claim 1, wherein said circulation channel includes a gas-liquid separating device for separating water and gas from the exhaust gas.

3. A fuel cell system according to claim 1, wherein said exhaust gas recovery channel includes a second exhaust gas storage unit, and a second control valve provided at a connection portion of said exhaust gas recovery channel and said supply channel, in addition to said first exhaust gas storage unit, and wherein said pressure adjusting unit sets said first exhaust gas storage unit to a negative pressure and also pressurizes said second exhaust gas storage unit,
   and wherein said control device controls opening of said first control valve and said second control valve.

4. A fuel cell system according to claim 1, wherein said exhaust gas recovery channel includes a fuel gas separating device for selectively separating fuel gas from the exhaust gas.

5. A fuel cell system according to claim 4, wherein reactant gas included in impurity gas yielded by separating the fuel gas from the exhaust gas by said fuel gas separating device is burnt by a combustion device connected to said fuel gas separating device.

6. A fuel cell system according to claim 1, wherein said exhaust gas recovery channel further comprises a bypass channel circumventing said pressure adjusting unit,
   and wherein said bypass channel includes a check valve for restricting backflow of the exhaust gas.

* * * * *